Patented Apr. 20, 1948

2,440,220

UNITED STATES PATENT OFFICE 2,440,220

CYCLIC ETHER

Herman A. Bruson, Rydal, and Thomas W. Riener, Philadelphia, Pa., assignors to The Resinous Products & Chemical Company, a corporation of Delaware No Drawing. Application November 6, 1945, Serial No. 627,088

5 Claims. (Cl. 260—333)

This invention relates to polycyclic internal ethers. It deals with products derived from 2,5-endomethylene-1,2,5,6-tetrahydro-benzyl alcohols having the formula:

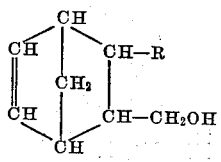

wherein R is hydrogen or a hydrocarbon group, particularly a lower alkyl group or a phenyl group, by intramolecular addition of the hydroxyl group thereof to the double bond to form saturated polycyclic ethers which possess cineol- or menthol-like properties.

According to this invention, the internal etherification is brought about by heating unsaturated polycyclic alcohols having the formula above with an acidic condensing agent as catalyst, preferably at temperatures of about 70° C. to about 150° C.

The unsaturated polycyclic alcohols used for the purpose of this invention are obtainable by heating cyclopentadiene or dicyclopentadiene with allyl alcohol or with crotyl alcohol or by reacting cyclopentadiene with acrolein, crotonaldehyde, cinnamaldehyde, or analogous unsaturated aldehyde to form a bicyclic adduct and subsequently reducing the aldehyde group of the adduct with aluminum isopropylate in isopropyl alcohol.

Typical acidic condensing agents which can be used for the internal etherification include the non-oxidizing mineral acids, notably sulphuric, phosphoric, hydrochloric, and fluoboric acids, as well as organic sulfonic acids such as benzene or toluene sulfonic acids or naphthalene sulfonic acid, and boron trifluoride or its oxygenated complexes with water, acids, alcohols, or ethers. Another efficient catalyst for the purpose of this invention comprises the finely divided, surface-active, acidic-type clays consisting chiefly of magnesium-aluminum hydrosilicates which are known commercially as "Attapulgus," "Tonsil," "Floridin," "Frankonite," and "Pikes Peak Clay."

The water-soluble acid catalysts are advantageously used in aqueous solution, preferably diluted so that the acid content is from about 5% to 25%. The other catalysts are advantageously used in the anhydrous form. The clays may be heated with the alcohol and the product isolated directly by straight run or steam distillation.

The products obtained are now new internal ethers, the exact structures of which have not yet been fully elucidated. Their empirical formulas correspond to the probable structure:

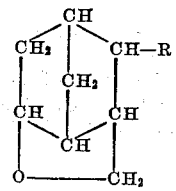

They possess characteristic cineol-like odors. When inhaled, their vapors open up the nasal passages, behaving in this respect like menthol. They also posses a burning taste. They may find use in the pharmaceutical field. In addition, they have solvent properties which recommend them as plasticizers.

The following examples illustrate this invention:

Example 1

The 2,5 - endomethylene - 1,2,5,6 - tetrahydrobenzyl alcohol used was prepared by heating allyl alcohol with cyclopentadiene or dicyclopentadiene at 175°–200° C. in an autoclave as described by Alder and Windemuth (Ber. 71, 1949 (1938)).

Fifty grams of 2,5-endomethylene-1,2,5,6-tetrahydro-benzyl alcohol was boiled under reflux for five hours with 500 grams of 15% sulfuric acid while the mixture was rapidly stirred. This mixture was then steam-distilled to yield 24 grams of the desired crystalline internal ether. This product melts at 100°–105° C. with sublimation. It boils at 172° C. (765 mm.). Its empirical formula is $C_8H_{12}O$. It is extremely soluble in petroleum ether, alcohol, benzene, or chloroform, but is not very soluble in water.

Example 2

A mixture of 42 grams of ethylene dichloride, 42 grams of 2,5-endomethylene-1,2,5,6-tetrahydro-benzyl alcohol, and 5 grams of boron trifluoride-diethyl ether complex, $BF_3 \cdot O(C_2H_5)_2$, was stirred at 60°–70° C. for three hours. The product was washed with water and with dilute soda solution and distilled in vacuo. The fraction boiling at 70°–80° C./10 mm. solidified and was identical with that described in Example 1.

Example 3

A mixture of 62 grams of 2,5-endomethylene-1,2,5,6-tetrahydro-benzyl alcohol and 400 grams of 15% hydrochloric acid was rapidly stirred and heated at 95°–100 C. under a reflux condenser for five hours. The oil layer was separated by means of ether, washed with soda solution, and distilled at atmospheric pressure. The fraction boiling at 169°–184° C. solidified. Upon redistillation, it boiled at 172° C. The yield was about 30 grams of internal ether, identical with that described in Example 1.

*Example 4*

The above example was repeated, except that 400 grams of 20% phosphoric acid was used in place of the hydrochloric acid. The desired ether was obtained in a 25-gram yield.

*Example 5*

A mixture of 124 grams of 2,5-endomethylene-1,2,5,6-tetrahydro-benzyl alcohol and 50 grams of an acidic siliceous clay, such as "Tonsil," "Floridin," "Terrana," or "Pikes Peak Clay," was heated in a distilling flask and the evolved vapors were condensed. The distillate consisted of water and the desired internal ether. The yield was 80 grams.

*Example 6*

A mixture of 15 grams of "Pikes Peak Clay" or of "Tonsil Clay" and 57 grams of 6-methyl-2,5 - endomethylene - 1,2,5,6 - tetrahydro-benzyl alcohol:

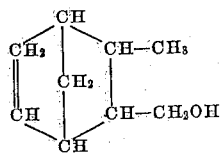

was heated slowly in a distilling flask connected to a water-cooled condenser, distillation taking place at atmospheric pressure.

The oily fraction distilling at 170°–190° C. amounted to 29 grams. It was dried with calcium chloride and redistilled in vacuo to yield 20 grams of colorless liquid boiling at 75° C./17 mm., possessing an odor of cineol. Its formula, $C_9H_{14}O$, corresponds to the probable structure:

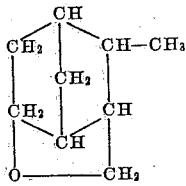

In the same way, other 2,5-endomethylene-1,2,5,6-tetrahydro-benzyl alcohols may be converted into internal ethers.

We claim:

1. As new compositions of matter, the internal ethers formed by the rearrangement resulting by heating alcohols of the formula:

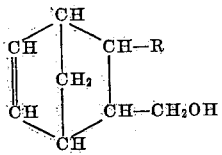

wherein R is selected from a member of the group consisting of hydrogen, methyl and phenyl groups, in the presence of an acidic condensing agent as catalyst, said internal ethers having the probable structure

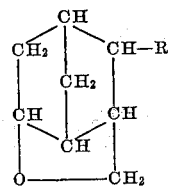

2. As a new composition of matter, the internal ether formed by the rearrangement resulting by heating an alcohol of the formula:

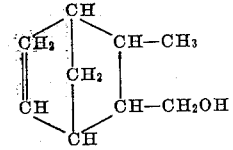

in the presence of an acidic condensing agent as catalyst, said internal ether having the probable structure

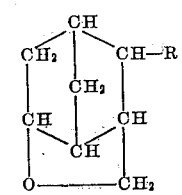

3. A method for preparing internal ethers from alcohols of the formula:

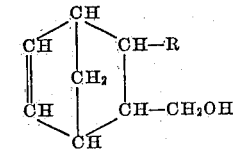

wherein R is selected from a member of the group consisting of hydrogen, methyl and phenyl groups, which comprises heating said alcohols with an acidic condensing agent as catalyst, said internal ethers having the probable structure

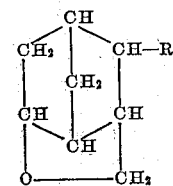

4. A method for preparing internal ethers from alcohols of the formula:

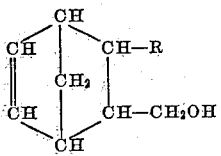

wherein R is selected from a member of the group consisting of hydrogen, methyl and phenyl groups, which comprises heating said alcohols with a surface-active, acidic siliceous clay, said internal ethers having the probable structure

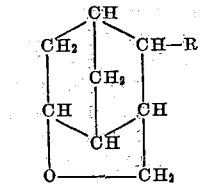

5. A method for preparing internal ethers from alcohols of the formula:

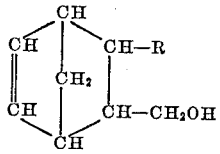

wherein R is selected from a member of the group consisting of hydrogen, methyl and phenyl groups, which comprises heating said alcohols with dilute sulfuric of about 5% to 25% strength, said internal ethers having the probable structure

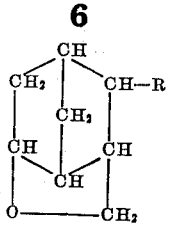

HERMAN A. BRUSON.
THOMAS W. RIENER.

REFERENCES CITED

The following references are of record in the file of this patent:

UNITED STATES PATENTS

| Number | Name | Date |
| --- | --- | --- |
| 2,352,606 | Alder & Windemuth | July 4, 1944 |

Certificate of Correction

Patent No. 2,440,220. April 20, 1948.

HERMAN A. BRUSON ET AL.

It is hereby certified that errors appear in the printed specification of the above numbered patent requiring correction as follows: Column 3, lines 33 and 53, Example 6, and column 4, line 13, claim 2, in the formulae, for "$CH_2$" read $CH$; same column 4, line 23, claim 2, for "$CH-R$" read $CH-CH_3$; and that the said Letters Patent should be read with these corrections therein that the same may conform to the record of the case in the Patent Office.

Signed and sealed this 20th day of July, A. D. 1948.

[SEAL]

THOMAS F. MURPHY,
*Assistant Commissioner of Patents.*